United States Patent
Collard et al.

(10) Patent No.: US 8,185,697 B1
(45) Date of Patent: May 22, 2012

(54) METHODS AND SYSTEMS FOR COHERENCE PROTOCOL TUNING

(75) Inventors: Jean-Francois Collard, Sunnyvale, CA (US); Sami Yehia, Cherry Hinton (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1961 days.

(21) Appl. No.: 11/030,937

(22) Filed: Jan. 7, 2005

(51) Int. Cl.
*G06F 12/00* (2006.01)
(52) U.S. Cl. .................................... 711/141
(58) Field of Classification Search .............. 711/141
See application file for complete search history.

(56) References Cited

U.S. PATENT DOCUMENTS

| | | | | |
|---|---|---|---|---|
| 5,442,758 | A * | 8/1995 | Slingwine et al. | 707/8 |
| 2004/0015969 | A1 * | 1/2004 | Chang | 718/100 |
| 2004/0117561 | A1 * | 6/2004 | Quach et al. | 711/146 |
| 2005/0216637 | A1 * | 9/2005 | Smith et al. | 710/305 |

* cited by examiner

*Primary Examiner* — Midys Rojas

(57) ABSTRACT

A method and system for selectively applying one of a plurality of different memory coherence protocols are described. When an application is executed to generate a memory access transaction, a table can be evaluated to determine whether the transaction should be processed in accordance with a first memory coherence protocol or a second memory coherence protocol. Then, the transaction can be processed according to the selected memory coherence protocol. Alternatively, or in conjunction therewith, the application can be modified to execute more efficiently on a particular memory coherence protocol.

23 Claims, 7 Drawing Sheets

METHODS AND SYSTEMS FOR COHERENCE PROTOCOL TUNING

BACKGROUND

The present invention relates generally to programming techniques and systems and, more particularly, to programming techniques and systems which tune coherence protocols to improve application performance.

The power of computers to process data continues to grow at a rapid pace. As computing power increases, software applications which are developed for new computing platforms become more sophisticated and more complex. It is not uncommon for teams of software developers to develop applications having hundreds of thousands, or even millions, of lines of software code. With the additional complexity comes additional challenges in terms of, for example, performance evaluation and improvement, e.g., to identify portions of the software code which can be improved so that the program as a whole runs faster.

It can be difficult to identify which aspects of complex systems and software code to focus on during optimizations. When tuning a shared-memory application, for example, the coherence protocol is often overlooked. Shared-memory applications being executed on parallel processors will typically employ cache memory to bring data closer to the processor which is operating on that data. However, using local caches requires that a mechanism be employed so that the various processors and memory controllers operating in the system have a coherent global view of the data, which mechanisms are referred to as "coherence protocols". For example, coherence protocols generally define how (and which) memory devices will be updated when a write operation is performed. A variety of different coherence protocols are in use today.

However, coherence protocols tend to be fixed within each system, even though there is likely no single protocol that is optimal for all applications. Moreover, even if a mechanism is provided in a particular system to permit code optimization based on that system's coherence protocol, there is no automated way to use such a mechanism. Thus, applications are frequently executed on processing systems without optimization for the processing system's coherence protocol.

Accordingly, it would be desirable to provide systems and methods tuning coherence protocols.

SUMMARY

According to one exemplary embodiment of the present invention, a method for selectively applying one of a plurality of different memory coherence protocols includes the steps of executing an application in a processing system, receiving a transaction that involves a memory access, evaluating a table to determine whether the transaction should be processed in accordance with a first memory coherence protocol or a second memory coherence protocol, wherein the first memory coherence protocol is different than the second memory coherence protocol; and processing the transaction using a selected one of the first and second memory coherence protocols.

According to another exemplary embodiment of the present invention, a method for modifying an application based on a memory coherence protocol includes the steps of executing the application on a processing system which uses the memory coherence protocol, identifying instructions within the application which execute inefficiently using the memory coherence protocol and modifying the application based on the step of identifying.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1A:
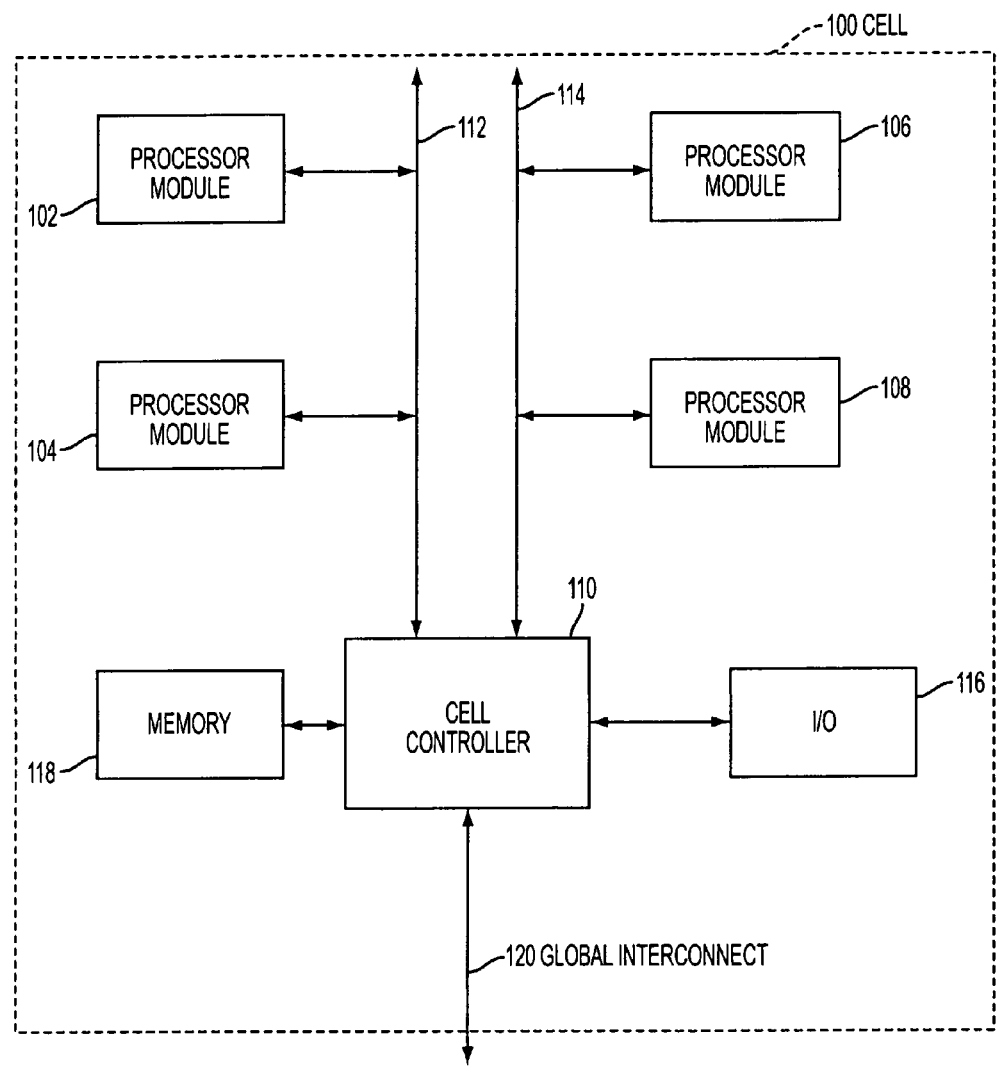
FIG. 1(a) illustrates a cell of a processing system in which exemplary embodiments of the present invention can be employed.
Figure 1B:
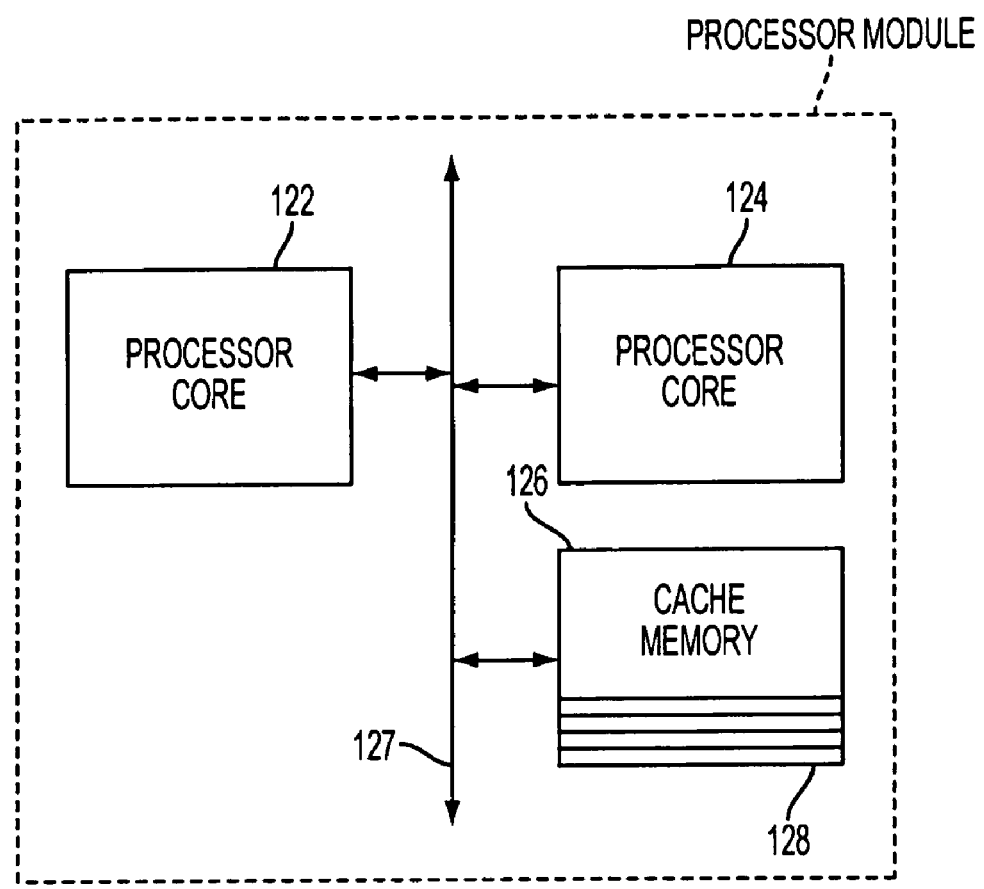
FIG. 1(b) illustrates a processor module of the cell of FIG. 1(a)
Figure 2:
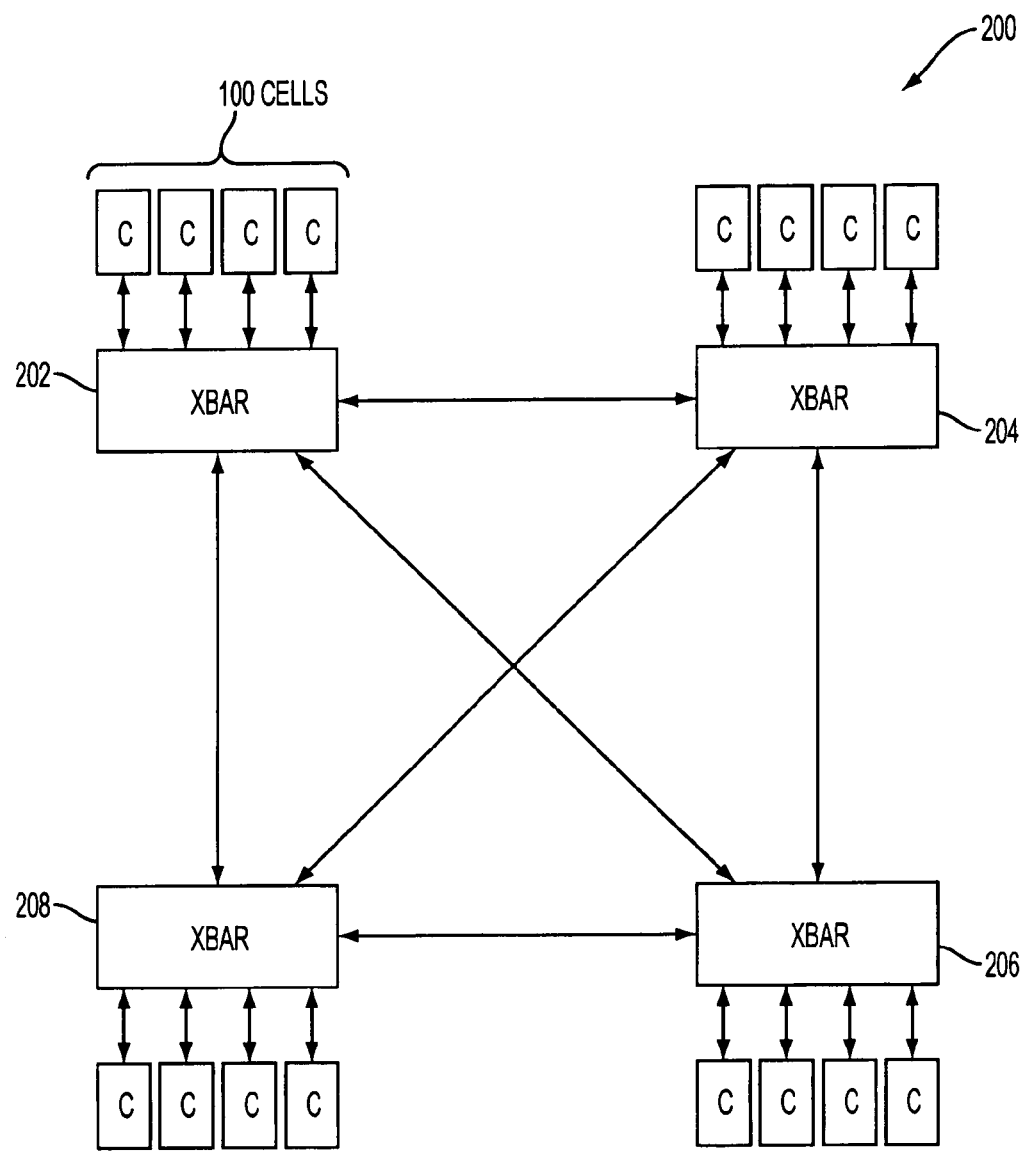
FIG. 2 illustrates a processing system including a plurality of cells in which exemplary embodiments of the present invention can be employed.

Prior to discussing techniques for tuning coherence protocols according to exemplary embodiments of the present invention, an exemplary system in which such techniques can be implemented is described below in order to provide some context. With reference to FIG. 1(a), one cell 100 of a processing system is illustrated. The cell includes four processor modules 102-108 linked to a cell controller 110 via interconnects 112 and 114. Each processor module 102-108 can include, for example, two processor cores 122 and 124 and a cache memory 126 which communicate via an interconnect 127 as shown in FIG. 1(b). The cache memory 126 includes a number of cache lines 128 each of which contain an amount of information which can be replaced in the cache memory 126 at one time, e.g., one or a plurality of data words or instructions. The size of the cache lines 128 will vary in different implementations, e.g., based on the data widths of the interconnects 112, 114, 120 and 127. The cell controller 110 is connected to I/O device 116 and memory device 118, as well as to a global interconnect 120. A plurality of cells 100 can be interconnected as shown in FIG. 2 to form an exemplary processing system 200. Therein, four cells (C) 100 are each directly connected to each of crossbar devices 202-208. The cache lines 128 associated with the processing system 200 can (from a processor core's perspective) have a state of either modified (i.e., dirty), exclusive (i.e., clean), shared or invalid and (from a cell controller's perspective) have a state of idle, shared or private. It will be appreciated that the particular architecture shown in FIGS. 1(a), 1(b) and 2, as well as cache line states, are purely exemplary and that the present invention can be implemented in processing systems having different architectures.

Figure 3A:
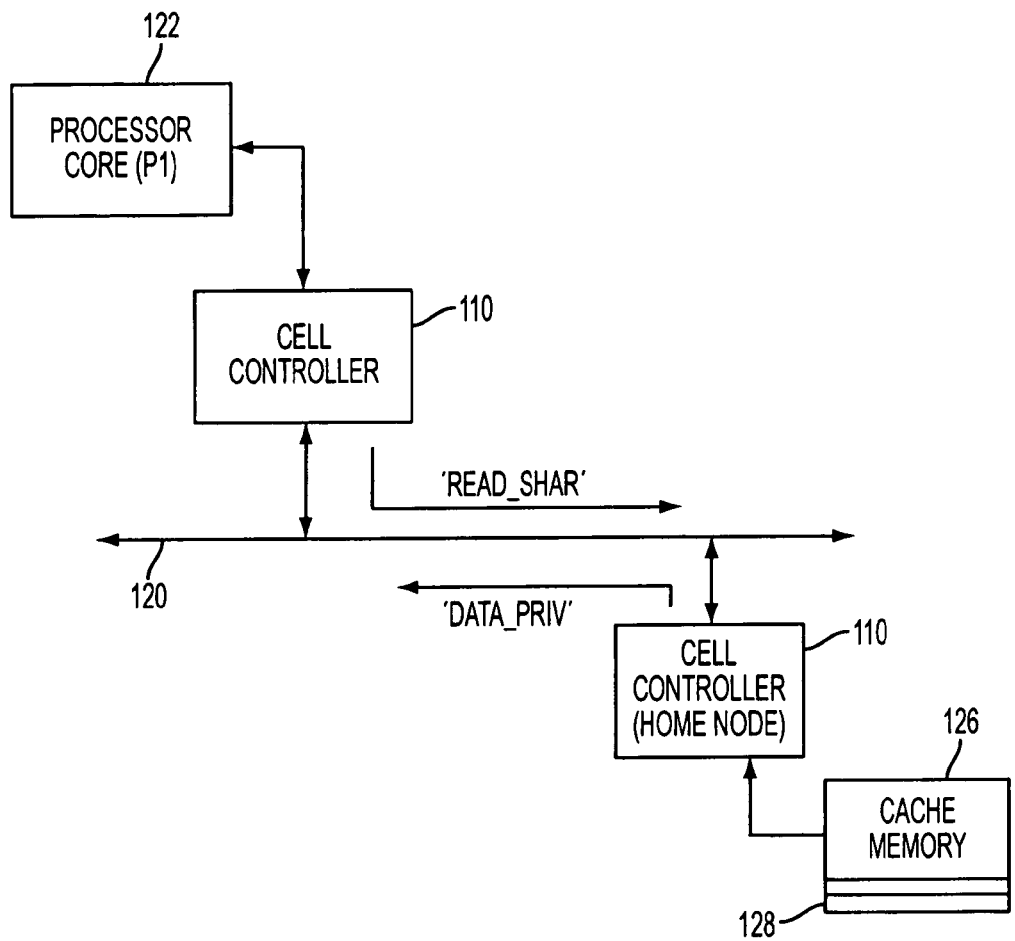
FIG. 3(a) illustrates transactions associated with a read request issued by a processor, and a subsequent response.

To understand how coherence protocol tuning operates in accordance with exemplary embodiments of the present invention, it is first useful to describe some exemplary cache memory transactions associated with the exemplary architecture of FIGS. 1(a), 1(b) and 2. Referring now to FIG. 3(a), consider a read request that is transmitted by a processor P1 to read a particular cache line 128. For purposes of this specification, this read request is referred to herein as a "READ_SHAR" transaction although the particular nomenclature is purely illustrative. The cell controller 110 associated with processor P1 can identify the corresponding cell controller 110 which has access to the cache line 128 specified in the READ_SHAR request from P1. This latter cell controller 110 shall be referred to herein as the "home node" (H). The cell controller 110 thus forwards the READ_SHAR request to the home node H, which reads the directory entry for the requested cache line 128. Assume that, for this example, the home node H determines that the requested cache line 128 is in the idle state. Thus, the home node H is able to immediately return the requested cache line's data to processor P1 (via its cell controller 110). Additionally, according to the original coherence protocol associated with system 200, home node H also transfers private (write) ownership of the requested cache line to processor P1 as part of this transaction. For purposes of this specification, this responding transaction is referred to herein as a "DATA_PRIV" transaction although the particular nomenclature is purely illustrative.

Figure 3B:
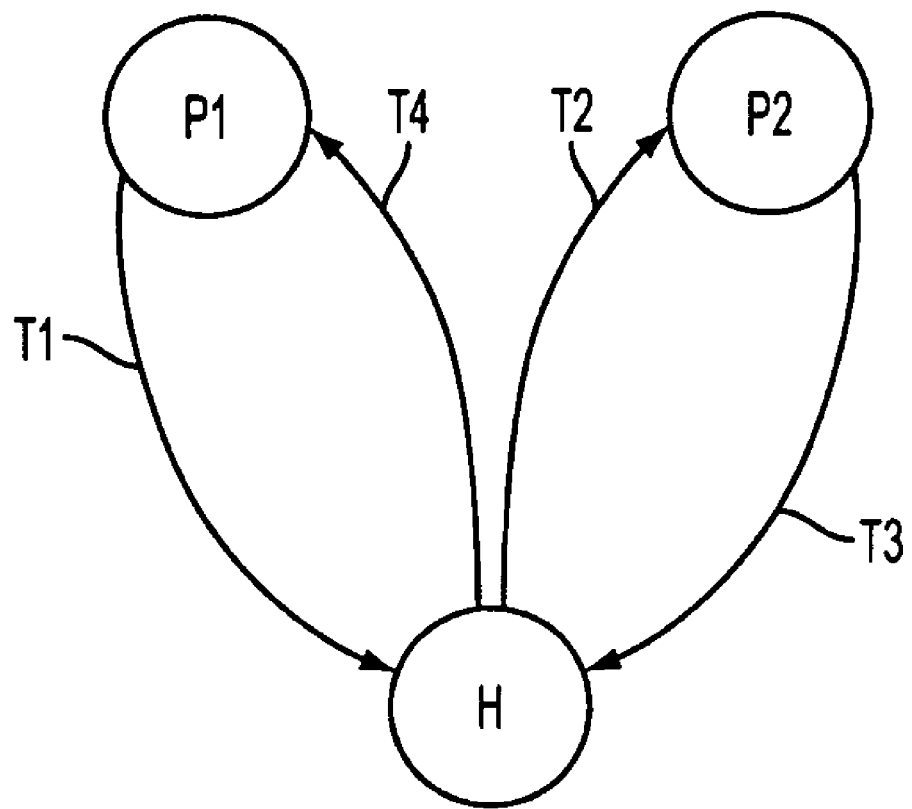
FIG. 3(b) illustrates transactions associated with read request issued by a processor, and subsequent responses, according to a different scenario than that of FIG. 3(a)

Now consider an alternative scenario, illustrated in FIG. 3(b), wherein processor P1 makes the same read request (transaction T1) but, instead of the requested cache line being idle, it is instead owned by another processor P2. In this case, when the home node H checks the directory entry corresponding to the requested cache line 128, it determines that its status is private and sends an inquiry (transaction T2) to processor P2 regarding the status of the requested cache line 128. Processor P2 may issue one of three responses based on its knowledge of the status of the requested cache line. In a first case, if the cache line 128 is exclusive (clean), processor P2 can reply with a response (transaction T3) indicating that it will share the cache line. Then, the home node H sends the data to processor P1 and adds processor P1 to the set of sharers for this cache line 128.

In a second case, if the requested cache line 128 has a status of invalid in processor P2, then processor P2 sends a cache line invalid response back to home node H as transaction T3. In a third case, if the requested cache line 128 has a status of modified (dirty), processor P2 responds with a message to the home node H that returns the current cache line content and relinquishes its ownership of the cache line as transaction T3. Home node H, for either the second or third case, sends processor P1 both the requested cache line of data and, of particular interest for this discussion, ownership (write access) of the requested cache line 128.

This feature of the original coherence protocol of processing system 200, i.e., that ownership of a cache line 128 is transferred to a processor which requests a read of that cache line 128, can increase the total number of transactions associated with an application being executed on the processing system 200 under certain circumstances. For example, consider the further scenario wherein, after processor P1 receives the requested cache line and ownership, another processor P3 now wants to read the same cache line. The home node H is not able to immediately service this request since P1 may have modified the requested cache line. Accordingly, the home node H has to request an up-to-date value for the requested cache line from processor P1 before it can respond to processor P3. In this case, the characteristic of the original coherence protocol wherein it speculatively grants write privileges to a read requestor has the associated effect of increasing the total number of transactions and reducing program efficiency.

An alternate coherence protocol can instead be applied to processing system 200. For example, the alternate coherence protocol can have the opposite rule—that a read requestor will not be granted a write privilege along with its requested cache line. Using the example described above with respect to FIG. 3, this means that when P1 issues a READ_SHAR request for a particular cache line, the home node H will return the requested data, but will not automatically grant write access to that cache line as well. More specifically, when the processing system 200 is operating in accordance with the alternate coherence protocol, the home node H will return a DATA_SHAR transaction to processor P1 instead of a DATA_PRIV response as in the original coherence protocol.

Surprisingly, simulations of applications executing on the processing system 200 under the alternate protocol showed that the total transaction count sometimes increased using the alternate coherence protocol as compared with the original coherence protocol. Further investigation showed that this was the result of other program code scenarios wherein the original coherence protocol operated more efficiently than the alternate coherence protocol. An example of this is code which operated to increment a shared variable, i.e., wherein a read request is immediately followed by an add and store operation to the same cache line. In that case, under the original coherence protocol, the processor performing the increment receives write access to the cache line along with the read request. By way of contrast, under the alternate coherence protocol, the store operation performed by the processor will require another transaction since it did not receive write access along with the read request.

Figure 4:
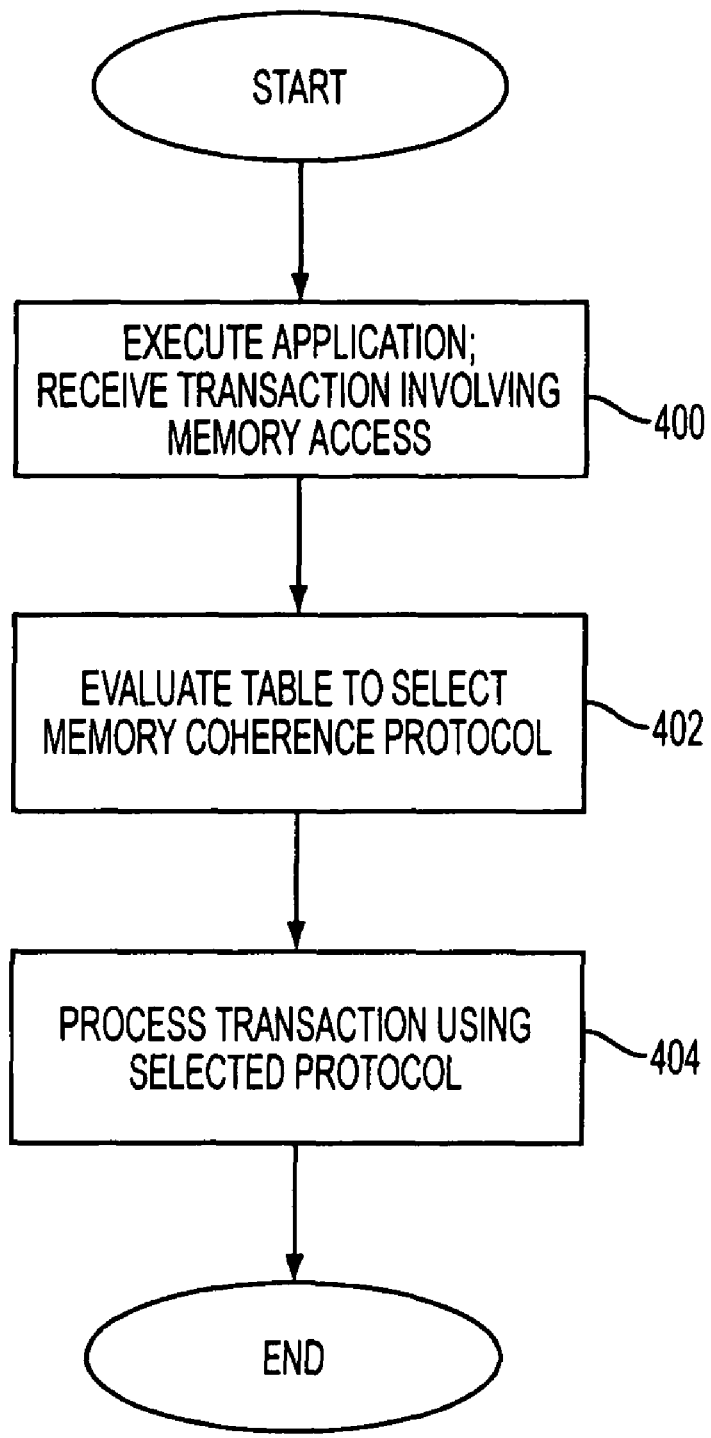
FIG. 4 is a flowchart illustrating a method for selectively using coherence protocols in accordance with exemplary embodiments of the present invention.

Exemplary embodiments of the present invention address the foregoing issues by providing techniques and systems for selectively applying one of a plurality of different coherence protocols, techniques and systems for selectively modifying applications or some combination thereof. The selectivity can be implemented on an instruction-by-instruction basis or for larger chunks of the application. A flowchart depicting a general method according to a first exemplary embodiment of the present invention is shown in FIG. 4. Therein, at step 400, an application is executed, resulting in a transaction involving a memory access occurring. This transaction is evaluated at step 402 using a table to select a memory coherence protocol to use in processing this transaction. The transaction is then processed using the selected protocol at step 404. These steps will now be described in more detail.

The flowchart of FIG. 4 illustrates an exemplary hardware solution which can include providing a plurality of tables within processing system 200 that coordinate selective use of one coherence protocol for the identified instructions and another coherence protocol for other instructions within the application. Again referring to the illustrative example of FIGS. 1-3, each cell controller 110 can include a table within which information can be stored that instructs the cell controller 110 to respond to certain read requests with a DATA_PRIV transaction (thereby granting write access to the requested cache line under the original coherence protocol). Other read requests, which do not generate table hits, will be responded to by the cell controller with the DATA_SHAR transaction (thereby not granting write access to the requested cache line under the alternate coherence protocol). The particular information stored in the tables, and used to determine which coherence protocol is used for which instruction, can vary. For example, the table can include target address information, instruction pointer information, processor ID information or any combination thereof.

In order to identify the information used to populate the table(s), the application is first executed to test its operation under one of the available memory coherence protocols. This execution generates performance data associated with the memory coherence protocol being tested, e.g., a sequence of coherence requests transmitted by each processor in system 200, along with a pointer to (address of) the corresponding instruction and the address of target data. This type of performance data can, for example, be generated by executing the application to be tuned on a simulator, e.g., software that simulates processing system 200. Alternatively, the application can be executed on processing system 200 (or another processing system) if the processing system includes a mechanism for correlating coherence protocol events with instructions in the application. Examples of such mechanisms can be found in co-pending, commonly assigned U.S. patent application Ser. No. 11/030,938, filed on Jan. 7, 2005, entitled "METHODS AND SYSTEMS FOR ASSOCIATING SYSTEM EVENTS WITH PROGRAM INSTRUCTIONS", the disclosure of which is incorporated here by reference.

Given this performance data, the instructions within the application which execute inefficiently, e.g., less efficiently under the first coherence protocol than they would under a different coherence protocol, are identified. This step can be performed in a number of different ways. For example, specific instruction sequences which generate coherence events during execution of the application in the simulator (or processing system) can be flagged. Using the illustrative example of FIG. 3 above, one such specific instruction sequence can be a read request, followed by a write request, wherein both the read request and the write request are sent by a same processor within processing system 200 and target the same cache line. When the performance data provides a pattern match with this transaction sequence, then the read request instruction in the application can be identified for association with a different memory coherence protocol, e.g., by storing matching instruction information in the table (or application modification as described below)'. However, those skilled in the art will appreciate that other techniques can be applied to identify individual instructions or sequences of instructions which would more efficiently operate (e.g., using fewer transactions to execute) under a different memory coherence protocol than the one which is tested.

Figure 5:
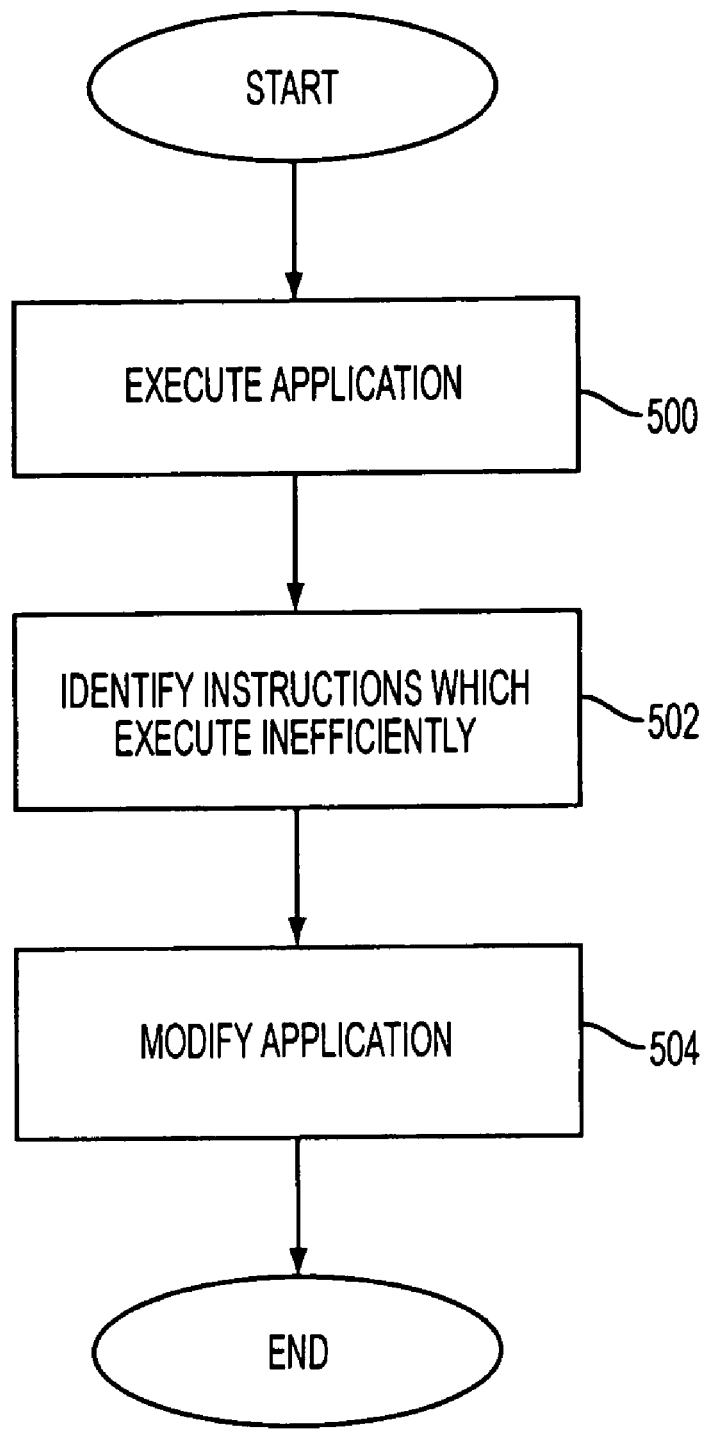
FIG. 5 is a flowchart illustrating a method for selectively modifying an application in accordance with exemplary embodiments of the present invention.

Instead of the foregoing hardware solution, or in addition thereto, the application itself can be modified to effectively change the memory coherence protocol for selected instructions. This exemplary embodiment of the present invention is illustrated by way of the flowchart of FIG. 5. Therein, at step 500 an application to be tuned is executed using a first coherence protocol, e.g., the alternate protocol described above. The instructions which execute inefficiently under the first protocol are identified at step 502. Then, at step 504, the application is modified such that subsequent executions of the application on processing system 200 will execute the identified instructions, or groups of instructions, in a manner which effectively results in those instructions using a second coherence protocol, e.g., the original protocol described above.

For example, the application can be modified at step 502 by inserting one or more instructions prior to an identified instruction to alter the behavior of the program such that it operates under the second memory coherence protocol for these instructions. Examples of these exemplary embodiments of the present invention include inserting a prefetch instruction prior to identified read requests to implement selective write access or inserting a write hint instruction. Those skilled in the art will appreciate that other variations on this exemplary embodiment of the present invention will depend upon the particular instruction set associated with the processors used to implement the processing system 200.

Yet another way to implement selective coherence protocols is to replace instructions in the application at step 502. For example, if the available instruction set includes instructions which provide the behavior associated with the second coherence protocol, then those instructions can be swapped for the original instructions during compilation of the program based on the identification performed in step 402. Again referring to the example of FIG. 3, suppose that the instruction set available in processing system 200 includes both a general load instruction (that requests data from a cache line but no ownership) and a special load instruction (that both requests data from a cache line and also requests ownership). In this case, identified read requests which are followed by DATA_PRIV requests for the same cache line in the application can be identified during the identification step 402. Then, in the modification step 404, these read requests can be swapped for the special load instruction to selectively implement the second (original) coherence protocol during subsequent executions of the application on processing system 200.

The foregoing description of exemplary embodiments of the present invention provides illustration and description, but it is not intended to be exhaustive or to limit the invention to the precise form disclosed. For example, although two alternative coherence protocols are used to describe the foregoing exemplary embodiments, those skilled in the art will appreciate that the present invention includes the capability to select between three or more different coherence protocol or protocol features. Modifications and variations are possible in light of the above teachings or may be acquired from practice of the invention. The following claims and their equivalents define the scope of the invention.

The invention claimed is:

1. A method for selectively applying one of a plurality of different memory coherence protocols comprising the steps of:
   executing an application in a processing system;
   receiving a transaction that involves a memory access;
   evaluating a table to determine whether said transaction should be processed in accordance with a first memory coherence protocol or a second memory coherence protocol, wherein said first memory coherence protocol is different than said second memory coherence protocol; and
   processing said transaction using a selected one of said first and second memory coherence protocols.

2. The method of claim 1, further comprising the steps of:
   storing, in said table, information including at least one of: target address information, instruction pointer information and processor ID information;
   responding to said transaction using said first memory coherence protocol if said transaction does not generate a match with said information in said table; and
   otherwise, responding to said transaction using said second memory coherence protocol.

3. The method of claim 2, wherein said table is provided in a cell controller associated with at least one processor and at least one memory device.

4. The method of claim 2, wherein said step of storing, in said table, information including at least one of: target address information, instruction pointer information and processor ID information further comprises the step of:

执行 said application on said processing system using said first memory coherence protocol;

identifying transactions within said application which execute inefficiently when using said first memory coherence protocol; and storing information associated with said identified transactions in said table.

5. The method of claim 4, wherein said step of executing said application further comprises the step of:

executing said application on a simulator.

6. The method of claim 4, wherein said step of executing said application further comprises the step of:

executing said application on another processing system which includes a mechanism for correlating coherence protocol events with instructions in said application.

7. The method of claim 4, wherein said step of executing said application further comprises the step of:

generating a sequence of coherence requests sent by each processor, together with an associated pointer to an instruction which caused each coherence request and an address of target data associated therewith.

8. The method of claim 4, wherein said step of identifying transactions within said application which execute inefficiently further comprises the step of identifying a specific transaction sequence generated by said application.

9. The method of claim 8, wherein said specific transaction sequence pattern is a read request, followed by a write request, wherein both said read request and said write request are sent by a same processor and target a same cache line.

10. The method of claim 4, further comprising the step of:

modifying said application to insert at least one instruction before an instruction associated with one of said identified transactions.

11. The method of claim 4, further comprising the step of:

modifying said application to replace an instruction associated with an identified transaction with another instruction, wherein said another instruction implements an aspect of said second memory coherence protocol.

12. The method of claim 1, wherein said first and second memory coherence protocol describe how and which memory devices will be updated when a write operation is performed.

13. A processing system for processing data in accordance with one of a plurality of memory coherence protocols comprising:

a plurality of processors for initiating transactions within said processing system;

a plurality of tables which contain instruction identification information; and a plurality of controllers which selectively return responses to said transactions according to either a first memory coherence protocol or a second memory coherence protocol depending upon whether a respective transaction includes data which matches a table entry.

14. The processing system of claim 13, wherein said instruction identification information includes at least one of: target address information, an instruction pointer and a processor ID.

15. The processing system of claim 13, wherein said first and second memory coherence protocol describe how and which memory devices will be updated when a write operation is performed.

16. A processing system for processing data in accordance with one of a plurality of memory coherence protocols comprising:

means for initiating transactions within said processing system;

means for storing instruction identification information; and means for selectively responding to said transactions according to either a first memory coherence protocol or a second memory coherence protocol depending upon whether a respective transaction includes data which matches a table entry.

17. The processing system of claim 16, wherein said instruction identification information includes at least one of: target address information, an instruction pointer and a processor ID.

18. The processing system of claim 16, wherein said first and second memory coherence protocol describe how and which memory devices will be updated when a write operation is performed.

19. A method for selectively applying one of a plurality of different memory coherence protocols comprising the steps of:

executing an application in a processing system;

receiving a request that involves a memory access;

determining whether said request should be processed in accordance with a first memory coherence protocol or a second memory coherence protocol, wherein said first memory coherence protocol is different than said second memory coherence protocol, in order to execute said request efficiently; and processing said transaction using a selected one of said first and second memory coherence protocols.

20. The method of claim 19, wherein said step of determining further comprises the step of:

selecting a one of said first memory coherence protocol and said second memory coherence protocol which will result in said request being executed using a least number of transactions.

21. The method of claim 19, wherein said determining step further comprises the step of:

evaluating a table to determine whether said request should be processed in accordance with said first memory coherence protocol or said second memory coherence protocol.

22. The method of claim 19, wherein said step of processing said transaction further comprises the step of:

modifying said application based on said step of determining to implement either said first memory coherence protocol or said second memory coherence protocol for said request.

23. The method of claim 19, wherein said first and second memory coherence protocol describe how and which memory devices will be updated when a write operation is performed.

* * * * *